United States Patent
Kapoor et al.

(10) Patent No.: US 12,130,749 B2
(45) Date of Patent: *Oct. 29, 2024

(54) VALIDATION OF STORE COHERENCE RELATIVE TO PAGE TRANSLATION INVALIDATION

(71) Applicant: International Business Machines Corporation, Armonk, NY (US)

(72) Inventors: Shakti Kapoor, Austin, TX (US); Nelson Wu, Austin, TX (US); Manoj Dusanapudi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,132

(22) Filed: Feb. 23, 2023

(65) Prior Publication Data

US 2023/0195649 A1 Jun. 22, 2023

Related U.S. Application Data

(63) Continuation of application No. 17/493,212, filed on Oct. 4, 2021, now Pat. No. 11,620,235.

(51) Int. Cl.
*G06F 12/1027* (2016.01)
*G06F 7/58* (2006.01)
(Continued)

(52) U.S. Cl.
CPC .......... *G06F 12/1027* (2013.01); *G06F 7/586* (2013.01); *G06F 9/30043* (2013.01);
(Continued)

(58) Field of Classification Search
None
See application file for complete search history.

(56) References Cited

U.S. PATENT DOCUMENTS 6,338,128 B1 1/2002 Chang et al.
10,031,858 B2 7/2018 Aslot et al.
(Continued)

FOREIGN PATENT DOCUMENTS

CN 111338987 A 6/2020

OTHER PUBLICATIONS

Kumar, M., et al., "LATR: Lazy Translation Coherence", ASPLOS'18, Mar. 24-28, 2018, 14 pages.
(Continued)

*Primary Examiner* — Charles J Choi
(74) *Attorney, Agent, or Firm* — SCULLY, SCOTT, MURPHY & PRESSER, P.C.; Stosch Sabo

(57) ABSTRACT

Systems and methods for invalidating page translation entries are described. A processing element may apply a delay to a drain cycle of a store reorder queue (SRQ) of a processing element. The processing element may drain the SRQ under the delayed drain cycle. The processing element may receive a translation lookaside buffer invalidation (TLBI) instruction from an interconnect connecting the plurality of processing elements. The TLBI instruction may be an instruction to invalidate a translation lookaside buffer (TLB) entry corresponding to at least one of a virtual memory page and a physical memory frame. The TLBI instruction may be broadcasted by another processing element. The application of the delay to the drain cycle of the SRQ may decrease a difference between the drain cycle of the SRQ and an invalidation cycle associated with the TLBI.

20 Claims, 6 Drawing Sheets

(51) Int. Cl.
  *G06F 9/30* (2018.01)
  *G06F 12/0882* (2016.01)
  *G06F 12/0891* (2016.01)
  *G06F 13/16* (2006.01)

(52) U.S. Cl.
  CPC ...... *G06F 9/30134* (2013.01); *G06F 12/0882* (2013.01); *G06F 12/0891* (2013.01); *G06F 13/1626* (2013.01); *G06F 13/1668* (2013.01)

(56) References Cited

U.S. PATENT DOCUMENTS

| 10,891,240 B2 | 1/2021 | Mathew et al. |
| 2017/0286300 A1 | 10/2017 | Doshi et al. |
| 2019/0108034 A1 | 4/2019 | Lloyd et al. |

OTHER PUBLICATIONS

Yan, Z. et al., "Hardware Translation Coherence for Virtualized Systems", arXiv:1701.07517v1, Jan. 25, 2017, 13 pages.

Hechtman, B.A., et al., "The Limits of Concurrency in Cache Coherence", Appears in the 10th Annual Workshop on Duplicating, Deconstructing and Debunking (DDD 2012) Held in conjunction with the 39 International Symposium on Computer Architecture (ISCA-39), Jun. 2012, 8 pages.

Disclosed Anonymously, "A Mechanism for Fast Cached Object Invalidation from a Database", An IP.com Prior Art Database Technical Disclosure, IP.com No. IPCOM000229445D, Jul. 30, 2013, 4 pages.

Disclosed Anonymously, "Implementing Locks in a Shared-Memory Multiprocessor Using a Simplified Coherence Protocol", An IP.com Prior Art Database Technical Disclosure, IP.com No. IPCOM000200052D, Sep. 24, 2010, 6 pages.

Disclosed Anonymously, "Method for Enabling Advanced Load/Validation Instructions and a Data-Speculation Validation Structure Without the Use of Snooping", An IP.com Prior Art Database Technical Disclosure, IP.com No. IPCOM000022675D, Mar. 25, 2004, 4 pages.

International Search Report and Written Opinion dated Nov. 28, 2022, received in a corresponding foreign application, 10 Pages.

U.S. Appl. No. 17/493,212, filed Oct. 4, 2021.

VALIDATION OF STORE COHERENCE RELATIVE TO PAGE TRANSLATION INVALIDATION

BACKGROUND

The present invention relates to executions in a processor and more specifically to data processing, and more specifically to cache coherence and page translation invalidations in a multicore processor, microprocessor, or a multiprocessor system.

In an example, a computing system may utilize virtual memory to access addresses in physical memory without a need to account for exact locations of the address in the physical memory. A mapping of virtual memory addresses to physical memory addresses may be maintained and may be stored as a page table. In an example, when a program accesses a virtual memory address, an address translation using the page table may be performed to determine which physical memory address is referenced by the accessed virtual memory address. The data stored at the determined physical memory address may be read from the physical memory address.

In a multiprocessor system including multiple processing elements (e.g., a system having multiple processors, a processor having multiple cores), all cores may share the page table. To improve efficiency of accessing the translations in the page table, each processing element (processor or core) may store its own translation lookaside buffer (TLB), where each TLB may be a cache representing a portion of the page table. A TLB may include a number of entries from the page table, and each TLB entry may include a mapping from a virtual address to a physical address. In an example, the TLB entries may be maintained such that a portion of the total available memory covered by the TLB may include the most recently accessed, most commonly accessed, or most likely to be accessed portion of the total available memory. As data is moved into and out of the physical memory (e.g., a new process being invoked or a context switch), the entries in the TLBs needs to be updated to reflect the presence of the new data, and the TLB entries associated with data removed from system memory needs to be invalidated. Since each core maintains its own TLB, the cores need to communicate with one another to maintain cache coherency.

SUMMARY

The summary of the disclosure is given to aid understanding of the computer processing systems and methods of invalidating page translation entries and maintaining cache coherence, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In some examples, a method for invalidating page translation entries in a data processing system are generally described. The data processing system may include a plurality of processing elements. The method may include applying a delay to a drain cycle of a store reorder queue (SRQ) of a processing element. The method may further include draining the SRQ under the delayed drain cycle. The method may further include receiving a translation lookaside buffer invalidation (TLBI) instruction from an interconnect connecting the plurality of processing elements. The TLBI instruction may be an instruction to invalidate a translation lookaside buffer (TLB) entry corresponding to at least one of a virtual memory page and a physical memory frame. The TLBI instruction may be broadcasted by another processing element. The application of the delay to the drain cycle of the SRQ may decrease a difference between the drain cycle of the SRQ and an invalidation cycle associated with the TLBI.

In some examples, a computing system configured to invalidate page translation entries in a data processing system are generally described. The computing system may include a first processing element, a second processing element, and an interconnect connected to the first processing element and the second processing element. The first processing element may be configured to broadcast a translation lookaside buffer invalidation (TLBI) instruction on the interconnect. The TLBI instruction may be an instruction to invalidate a translation lookaside buffer (TLB) entry corresponding to at least one of a virtual memory page and a physical memory frame. The second processing element may be configured to apply a delay to a drain cycle of a store reorder queue (SRQ) of the second processing element. The second processing element may be further configured to drain the SRQ under the delayed drain cycle. The second processing element may be further configured to receive the TLBI instruction from the interconnect. The application of the delay to the drain cycle of the SRQ decreases a difference between the drain cycle of the SRQ and an invalidation cycle associated with the TLBI.

In some examples, a processing element configured to invalidate page translation entries in a data processing system are generally described. The processing element may include a processor pipeline having one or more load store units (LSUs) configured to execute load and store instructions. The one or more LSUs may be configured to apply a delay to a drain cycle of a store reorder queue (SRQ) of the processing element. The one or more LSUs may be further configured to drain the SRQ under the delayed drain cycle. The one or more LSUs may be configured to receive a translation lookaside buffer invalidation (TLBI) instruction from an interconnect connecting a plurality of processing elements. The TLBI instruction may be an instruction to invalidate a translation lookaside buffer (TLB) entry corresponding to at least one of a virtual memory page and a physical memory frame. The TLBI instruction being broadcasted by another processing element. The application of the delay to the drain cycle of the SRQ decreases a difference between the drain cycle of the SRQ and an invalidation cycle associated with the TLBI.

Further features as well as the structure and operation of various embodiments are described in detail below with reference to the accompanying drawings.

BRIEF DESCRIPTION OF THE DRAWINGS

The various aspects, features, and embodiments of a processor, processor system, and/or method of processing data will be better understood when read in conjunction with the figures provided. Embodiments are provided in the figures for the purpose of illustrating aspects, features, and/or various embodiments of the processor, processor system, and methods of managing and processing data, but the claims should not be limited to the precise system, embodiments, methods, processes and/or devices shown, and the features, and/or processes shown may be used singularly or in combination with other features, and/or processes. It may be noted that a numbered element is numbered according to the figure in which the element is introduced, is often, but not always, referred to by that number in succeeding figures, and like reference numbers in the figures often, but not always, represent like parts of the illustrative embodiments of the invention.

DETAILED DESCRIPTION

Figure 1:
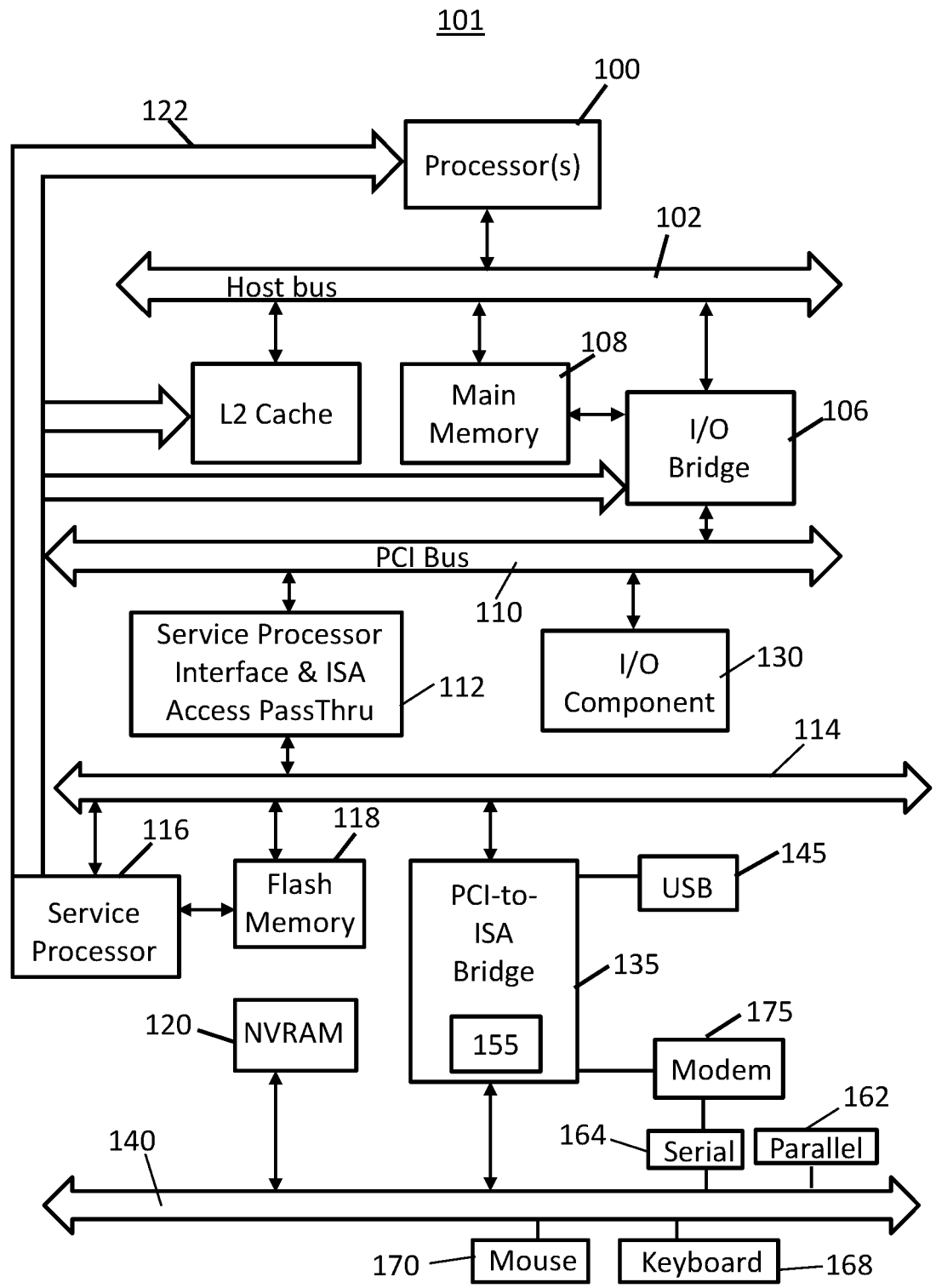
FIG. 1 depicts a general computing or data processing system in accordance with an embodiment.

The following description is made for illustrating the general principles of the invention and is not meant to limit the inventive concepts claimed herein. In the following detailed description, numerous details are set forth in order to provide an understanding of a processor, its architectural structure, and its method of operation, however, it will be understood by those skilled in the art that different and numerous embodiments of the processor, architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The term "workload" of a processor refers to the number of instructions being executed by the processor during a given period or at a particular instant of time.

A processor may process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In an example, the pipeline (in addition to other circuitry) may be placed in a portion of the processor referred to as the processor core. Some processors may have multiple processor cores (e.g., multiprocessor system), and in some cases, each processor core may have multiple pipelines. Where a processor core has multiple pipelines, groups of instructions (referred to as issue groups) may be issued to the multiple pipelines in parallel and executed by each of the pipelines in parallel. The pipeline may include multiple stages, such as a decode stage, a dispatch stage, an execution stage, etc. The execution stage may include execution units that process different types of operations as specified by the instructions. For example, a load store unit (LSU) is an execution unit that processes, for example, load instructions and store instructions.

In an example, the physical address of a store instruction that is executed may be stored as entries in a store reorder queue (SRQ) in a LSU. In an example, the SRQ may be in a L1 data cache of a processor core. The entries in the SRQ may be store instructions that are committed, where committed store instructions may be store instructions that are completed by a processor or processing element, the completion cannot be undone, and other processing elements are not aware of the completion until the SRQ is drained to memory (e.g., a level two (L2) cache). Upon draining a SRQ or a committed store instruction to memory (e.g., a level two (L2) cache), a value being stored or updated in a memory address specified by the committed store instruction may be visible to all processors or processing elements among the multiprocessor system. For example, if the L2 cache is a global memory that is accessible to all processing elements, then upon draining the SRQ entries to the L2 cache, the values being updated by the store instructions of the drained SRQ entries may be visible to all processing elements. In one or more example embodiments, the L2 cache may sometimes be a memory local to a processing element and higher level caches, such as level three (L3) cache may be global memory accessible to multiple processing elements. SRQ entries can be drained from a SRQ in a local memory to a global memory.

In an example, a mapping between a virtual address and a physical address may become invalid in response to specific events. For example, as data are moved into and out of the physical memory (e.g., a new process being invoked or a context switch), the entries in the TLBs needs to be updated to reflect the presence of the new data, and the TLB entries associated with data removed from system memory needs to be invalidated. In an example, an instruction for invalidating TLB entries may be referred to as a TLB invalidate instruction (TLBI). When a mapping between a virtual address and a physical address becomes invalid, a TLBI instruction is issued to all cores to remove TLB entries corresponding to the mapping being invalidated. In an example, one core may be tasked with broadcasting the TLBI instruction to other cores among the multiprocessor system.

In an example, a first processor may invalidate a specific TLB entry in its TLB, where the specific TLB entry may map a specific virtual address to a specific physical address. The first processor may stall any process and/or instructions relating to the specific physical address (e.g., committed store instructions writing to the specific physical address), and may broadcast the TLBI instruction on an interconnect accessible by all processors among the multiprocessor system. A second processor, among the multiprocessor system, may receive the TLBI instruction from the interconnect and, in response, may drain any SRQ entries relating to the specific physical address to memory. Upon the draining, the second processor may invalidate entries in its own TLB that includes the specific physical address. In response to the invalidation, the second processor may send an acknowledgement back to the first processor to indicate that the second processor has completed its TLB invalidation. The first processor may wait for the acknowledgement from the second processor, and from all other processors among the multiprocessor system, before invalidating the specific TLB entry in its own TLB.

However, in an example, A propagation time of the TLBI instruction may include the time it takes for the TLBI instruction to travel from the first processing element to the interconnect, to travel within the interconnect, and to travel from the interconnect to the second processing element. During this propagation time, the second processor may be draining its SRQ under its normal SRQ drain speed or cycle. A problem may arise if an SRQ entry associated with the specific physical address of the TLBI instruction is not drained by the second processing element before the second processing element sends the acknowledgement back to the first processing element that broadcasted the TLBI instruction. For example, a SRQ logic or algorithm may be used for detecting a completion of a SRQ drain by the second processing element. If the SRQ logic is corrupted and wrongly detect whether a SRQ is completely drained or not, then there is a possibility that the second processing element may send the acknowledgement before completely draining its SRQ. As a result of the second processing element failing to completely drain its SRQ before sending the acknowledgement, the value in the specific physical address indicated by the TLBI instruction may not be up to date upon all processing element completing their invalidations in accordance with the broadcasted TLBI instruction. For example, after all processing elements completed their respective invalidations, the processing elements may be reading an outdated value from the specific physical address. Thus, there is a conflicting condition between TLB entry invalidation (or page translation), the commitment in the SRQ, and the draining, where this conflicting condition may affect the visibility of the store instruction results to all processing elements in the multiprocessor system.

The methods and systems described herein may increase a window of the conflicting condition between a TLB entry invalidation (e.g., TLBI) cycle and a drain cycle of processors in a multiprocessor system to test whether the SRQ logic of the processors are functioning correctly. By increasing the window of this conflicting condition, the chances of a SRQ drain event (or the SRQ cycle) overlapping with a TLBI invalidation cycle can be increased. In an example, a delay may be applied to the drain cycle of the SRQ in a processor to slow down the draining of the SRQ. Traditionally, drain cycles may be shorter than invalidation cycles (e.g., the SRQ drain may be faster than the TLBI instruction propagation). Further, store instructions processing time may be variable since store instructions may be variable (e.g., because they are dependent on other threads and results from other processor cores) such that the drain cycle may become unpredictable. By applying a delay to the SRQ drain cycle, a processor may have additional chances and time to identify potential problems and corruption in the SRQ logic. For example, without the delay, a SRQ of a processor may drain relatively faster, and increases the chance that the SRQ may be empty when a processor receives a TLBI instruction from the interconnect. Since the SRQ logic indicates the SRQ is empty, the processor may send an acknowledgement without checking whether the SRQ is really empty or not, and the SRQ logic cannot be tested. The additional time from the delayed drain cycle may increase a chance of not having an empty SRQ when a processor receives a TLBI instruction, therefore allowing a test to determine whether the SRQ logic is functioning correctly in order to validate cache coherence. If the SRQ is not empty, then the processor may be triggered by the SRQ logic to check the SRQ and drain the SRQ before sending an acknowledgement. If the SRQ logic successfully triggers the processor to drain the SRQ before sending the acknowledgement, then cache coherence of the processor can be deemed as successful. If the SRQ logic does not successfully triggers the processor to drain the SRQ before sending the acknowledgement, then cache coherence of the processor can be deemed as a failure.

FIG. 1 illustrates an information handling system 101 which may be a simplified example of a computer system capable of performing the computing operations described herein. Computer system 101 may include one or more processor(s) 100 which is coupled to a host bus 102. The processor(s) 100 may include, for example, an off-the-shelf microprocessor, custom processor, Field Programmable Gate Array (FPGA), Application Specific Integrated Circuit (ASIC), discrete logic, etc., or generally any device for executing instructions. In an example, the processor(s) 101 may be multicore processors including two or more processor cores A level two (L2) cache memory 104 may be coupled to host bus 102. An I/O bridge (e.g., a Host-to-PCI bridge) 106 may be coupled to a main memory 108, where the I/O bridge may include cache memory and main memory control functions, and may provide bus control to handle transfers among a PCI bus 110, the processor 100, the L2 cache 104, the main memory 108, and the host bus 102. Main memory 108 may be coupled to the I/O bridge 106 as well as the host bus 102. Other types of memory, such as Random Access Memory (RAM), and/or various volatile and/or nonvolatile memory devices, may be coupled to the host bus 102 and/or the I/O bridge 106 as well. For example, memory devices coupled to the host bus 102 may include electrically erasable programmable read only memory (EEPROM), flash programmable read only memory (PROM), battery backup RAM, hard disk drives, etc. Nonvolatile memory devices coupled to the host bus 102 may be used for holding executable firmware and any nonvolatile data containing programming instructions that can be executed to cause the processor 100 to perform certain functions, such as the methods described herein. Devices used solely by processor(s) 100, such as I/O component(s) 130, may be coupled to PCI bus 110. Service Processor Interface and ISA Access Pass-through 112 may provide an interface between PCI bus 110 and PCI bus 114. In this manner, PCI bus 114 may be insulated from PCI bus 110. Devices, such as flash memory 118, are coupled to PCI bus 114. In one implementation, flash memory 118 may include BIOS code that incorporates necessary processor executable code for a variety of low-level system functions and system boot functions.

PCI bus 114 may provide an interface for a variety of devices that are shared by host processor(s) 100 and Service Processor 116 including, for example, flash memory 118. PCI-to-ISA bridge 135 provides bus control to handle transfers between PCI bus 114 and ISA bus 140, universal serial bus (USB) functionality 145, power management functionality 155, and can include other functional elements not shown, such as a real-time clock (RTC), DMA control, interrupt support, and system management bus support. Nonvolatile RAM 120 may be attached to ISA Bus 140. Service Processor 116 may include a bus 122 (e.g., JTAG and/or I2C bus) for communication with processor(s) 100 during initialization steps. The bus 122 may also be coupled to L2 cache 104, I/O bridge 106, and main memory 108 providing a communications path between processor, Service Processor, L2 cache, Host-to-PCI bridge, and main memory 108. Service Processor 116 also has access to system power resources for powering down information handling device 101.

Peripheral devices and input/output (I/O) devices can be attached to various interfaces (e.g., parallel interface 162, serial interface 164, keyboard interface 168, and mouse interface 170 coupled to ISA bus 140. Alternatively, many I/O devices can be accommodated by a super I/O controller (not shown) attached to ISA bus 140. Other interfaces that allow the processor(s) 100 to communicate with external devices may include, but are not limited to, serial interfaces such as RS-232, USB (Universal Serial Bus), Small Computer Systems Interface (SCSI), RS-309 or a wireless communication interface such as Wi-Fi, Bluetooth, near-field communication (NFC) or other wireless interfaces.

In an example, in order to attach computer system 101 to another computer system to copy files over a network, I/O component 130 may include a LAN card coupled to PCI bus 110. Similarly, to connect computer system 101 to an ISP to connect to the Internet using a telephone line connection, modem 175 is connected to serial port 164 and PCI-to-ISA Bridge 135. While FIG. 1 shows one information handling system that employs processor(s) 100, the information handling system may take many forms. For example, information handling system 101 may take the form of a desktop, server, portable, laptop, notebook, or other form factor computer or data processing system. Information handling system 101 may also take other form factors such as a personal digital assistant (PDA), a gaming device, ATM machine, a portable telephone device, a communication device or other devices that include a processor and memory.

Figure 2:
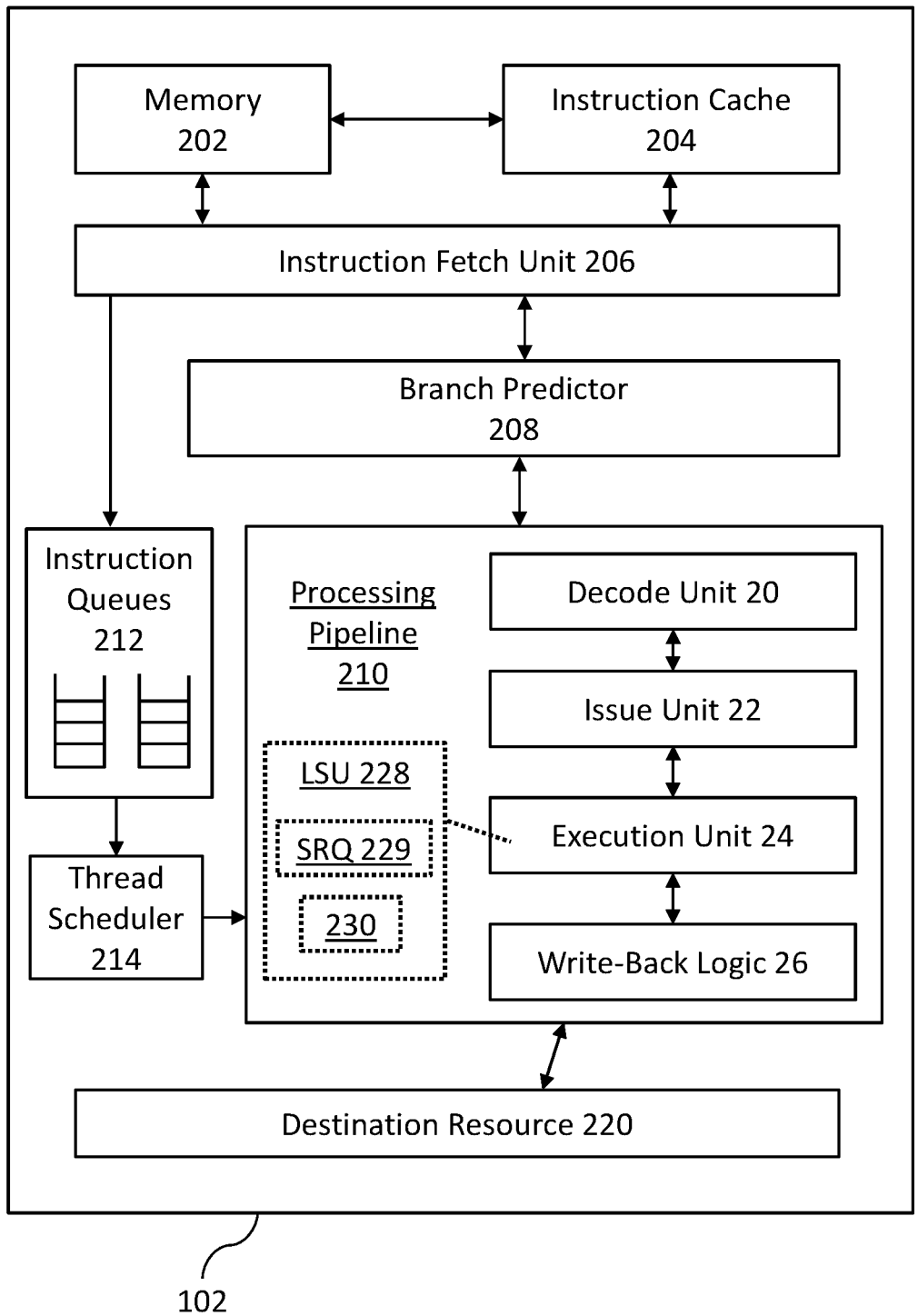
FIG. 2 a block diagram of a processor in accordance with an embodiment

FIG. 2 depicts a block diagram of a processor 200 according to an embodiment. The processor 200 may include at least a memory 202, an instruction cache 204, an instruction fetch unit 206, a branch predictor 208, and a processor pipeline or a processing pipeline 210. The processor 200 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 200. In one embodiment, instruction cache 204 may be configured to provide instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 200 may include multiple processing pipelines 210 and instruction fetch units 206. In an embodiment, the processing pipeline 210 includes a decode unit 20, an issue unit 22, an execution unit 24, and write-back logic 26. In some examples, the instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 200 is depicted in FIG. 2, other feedback and signaling paths may be included between elements of the processor 200.

Branch instructions (or "branch") can be either unconditional, meaning that the branch is taken every time that the instruction is encountered in the program, or conditional, meaning that the branch is either taken or not taken, depending upon a condition. The processor 200 can provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. The branch predictor 208 can attempt to predict the outcome of conditional branch instructions in a program before the branch instruction is executed. If a branch is mispredicted, all of the speculative work, beyond the point in the program where the branch is encountered, must be discarded. For example, when a conditional branch instruction is encountered, the processor 200 may predict which instruction will be executed after the outcome of the branch condition is known. Then, instead of stalling the processing pipeline 210 when the conditional branch instruction is issued, the processor may continue issuing instructions beginning with the predicted next instruction.

In a conditional branch, control can be transferred to the target address depending upon the results of a previous instruction. Conditional branches may be either resolved or unresolved branches depending on whether the result of the previous instruction is known at the time of the execution of the branch. If the branch is resolved, then it is known whether the branch is to be executed. If the conditional branch is not executed, the next sequential instruction stream immediately following the branch instruction is executed. If the conditional branch is executed, then the instruction stream starting at the target address is executed.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch can be discarded from the various units of processor 200.

The execution unit 24 may include a plurality of execution units, such as fixed-point execution units, floating-point execution units, load/store execution units (or load store unit denoted as LSU), and vector multimedia execution units. The execution unit 24 may also include specialized branch predictors to predict the target of a multi-target branch. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an example, an execution slice may be referred to as a set of data processing circuitry or hardware units connected in series within a processor core. An execution slice may be a pipeline or pipeline-like structure. Multiple execution slices may be used as part of simultaneous multi-threading within a processor core among multiple processor cores of a multiprocessor system. In modern computer architecture, there can be multiple execution units within an execution slice including LSUs, vector-scalar units (VSUs), arithmetic logic units (ALUs), among other execution units. A LSU typically includes one or more store queues each having entries to track store instructions and hold store data, and one or more load queues each having entries to track load instructions and hold load data.

In an embodiment, processor 200 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

To facilitate multithreading, instructions from different threads can be interleaved in some fashion at some point in the overall processor pipeline. An example technique to interleave instructions from different threads involves interleaving instructions on a cycle-by-cycle basis based on interleaving rules. For example, instructions from the different threads can be interleaved such that a processor can perform an instruction from a first thread in a first clock cycle, and then an instruction from a second thread in a second clock cycle, and subsequently another instruction from the first thread in a third clock cycle and so forth. Some interleaving techniques may involve assigning a priority to each thread and then interleaving instructions from the different threads based on the assigned priorities. For example, if a first thread is assigned to a higher priority than a second thread, an interleaving rule may require that twice as many instructions from the first thread assigned with the higher priority be included in the interleaved stream as compared to instructions from the second thread assigned with the lower priority. Various different interleaving rules can be set, such as rules designed for resolving threads with the same priority, or rules that interleave instructions from relatively less important threads periodically (e.g., performing instruction from a lower priority thread every X cycles).

Thread interleaving based on priorities can allow processor resources to be allotted based on the assigned priorities. However, thread priorities sometimes do not take into account processor events, such as branch mispredictions, that may affect the ability of threads to advance through a processor pipeline. These events can sometimes impact the efficiency of processor resources allotted between different instruction threads in a multi-thread processor. For example, priority-based techniques that give higher priority to threads with fewer instructions in the decode, rename, and instruction queue stages of the pipeline sometimes can be inefficient at reducing the number of wrong-path instructions caused by branch mispredictions (e.g., incorrectly speculated instructions) in the pipeline. These wrong-path instructions can tie up the fetch bandwidth and other valuable resources of the processor, such as instruction queues and other functional units.

Efficiency and/or performance of the processor 200 can be improved by reducing the number of wrong-path instructions in the processing pipeline 210. For example, threads with higher rate of mispredictions can be delayed (e.g., fetched slower by the instruction fetch unit) in the processing pipeline 210, causing a reduction in the number of wrong-path instructions in the processing pipeline 210. Further, a number of instructions following a first unfinished or unresolved branch instruction processing pipeline 210 can be tracked to prevent an excessive number of potentially wrong-path instructions being performed.

In an embodiment, the processor 200 can be a SMT processor configured to perform multithreading. The processor 200 can use one or more instruction queues 212 to collect instructions from the one or more different threads. The instruction fetch unit 206 can fetch instructions stored in the instruction cache 204 and fill the instruction queues 212 with the fetched instructions. Performance of the processor 200 can depend on how the instruction fetch unit 206 fill these instruction queues 212. The instruction fetch unit 206 can be configured to assign and manage priorities of the different threads, and based on these priorities, decide which instructions and/or which threads to fetch and send these fetched instructions to the instruction queues 212. The processor 200 can further include a thread scheduler 214 configured to schedule and distribute the instructions in the instruction queues 212 to the processing pipeline 210. In an example, the processor 200 may be a multicore processor including two or more processor cores, and each core may be configured to process a respective thread.

In an example, in response to the execution unit 24 being a load store unit (LSU) 228, a circuit 230 may be embedded or integrated in the LSU 228 to implement a SRQ drain delay. The SRQ drain delay may be, for example, delaying or slowing down a drain cycle of a store reorder queue (SRQ) 229 (or a store queue) to memory (e.g., L2 cache that may be part of destination resource 220). In an example, the circuit 230 may be activated (e.g., switched on) or deactivated (e.g., switched off) by the processor 200. Activation and deactivation of the circuit 230 may be based on an operating status of the processor 200 and/or other processors or processor cores within a multiprocessor system. For example, the processor 200 may activate the circuit 230 to apply a delay to a drain cycle of the SRQ 229 in the LSU 228. In another example, the processor 200 may deactivate the circuit 230 to prevent the application of the delay to the drain cycle of the SRQ 229 in the LSU 228. Application of the delay to the drain cycle of the SRQ 229 can allow the processor 200 to use additional time to validate whether cache coherence (e.g., including load and store coherence) of the processor 102 is a success or failure. For example, the additional time increases a chance of having committed store instructions remaining in the SRQ 229, such that the processor 102 can test SRQ logic being used for detecting empty SRQs and triggering sending acknowledgment signals. If the SRQ is always empty when a TLBI instruction arrives, then the SRQ logic cannot be tested. If the TLBI instruction is received, and the SRQ logic triggers a processing element to drain the SRQ before sending an acknowledgement signal, then the cache coherence of the processor 102 can be deemed as a success. If the TLBI instruction is received, and the SRQ logic does not trigger draining the SRQ and causes a processing element to send an acknowledgement signal without SRQ draining, then the cache coherence of the processor 102 can be deemed as a failure.

Figure 3:
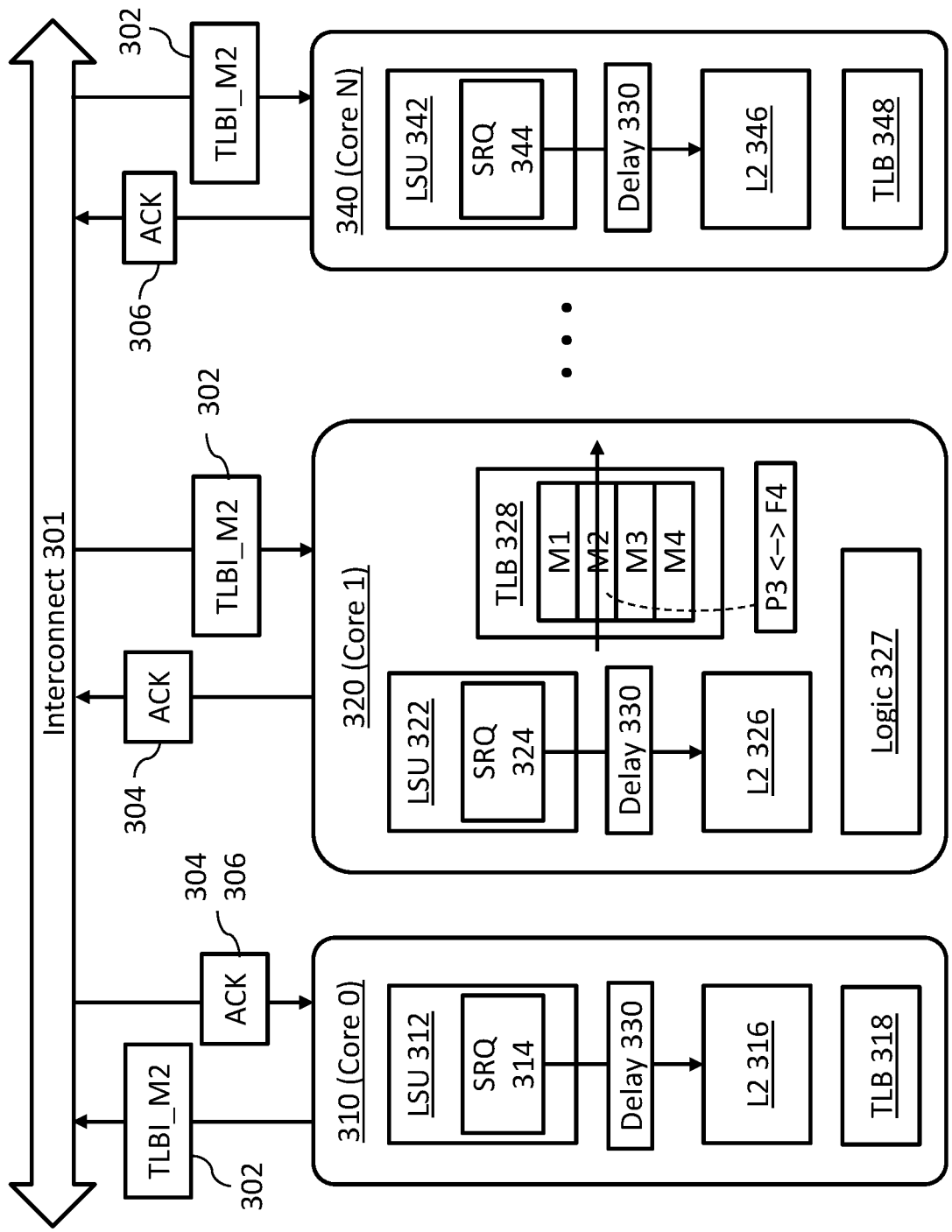
FIG. 3 illustrates an example implementation of validation of store coherence relative to page translation invalidation in an embodiment.

FIG. 3 illustrates an example implementation of validation of store coherence relative to page translation invalidation in one embodiment. In an example, the processor 200 (see FIG. 1 and FIG. 2) may include N processing elements, such as processing elements 310, 320, 340, labeled as Core 0, Core 1, and Core N. Although three processor cores are shown in FIG. 3 the processor 200 may include additional processor cores. An interconnect 301 (e.g., a bus, mesh network, crossbar, etc.) may connect Core 0, Core 1, and Core N, and other cores among the processor 200. Core 0 may include a load store unit (LSU) 312, a level two (L2) cache 316, and a TLB 318. The LSU 312 may include a SRQ 314. The TLB 318 may include a plurality of entries indicating mappings between virtual memory addresses allocated to Core 0 and physical memory address. For example, the TLB 318 may include entries labeled as M1, M2, M3, M4. Core 0 may include a load store unit (LSU) 312, a level two (L2) cache 316, and a TLB 318. The LSU 312 may include a SRQ 314. Core 1 may include a LSU 322, a L2 cache 326, and a TLB 328. The LSU 322 may include a SRQ 324. The TLB 328 may include a plurality of entries indicating mappings between virtual memory addresses allocated to Core 1 and physical memory address. Core N may include a LSU 342, a L2 cache 346, and a TLB 348. The LSU 342 may include a SRQ 344. The TLB 348 may include a plurality of entries indicating mappings between virtual memory addresses allocated to Core N and physical memory address. In one or more example embodiments, the L2 caches 316, 326, 346, may be individual memory banks of a global L2 cache that can be accessible by Cores 0, Core 1, Core N.

In an example, in response to an event, such as a context switch, Core 0 may invalidate an entry in the TLB 318 and may broadcast a translation lookaside buffer invalidation (TLBI) instruction 302 on the interconnect 301. The TLBI instruction 302 may be an instruction for other processing elements to invalidate one or more TLB entries in their respective TLBs corresponding to a specific virtual address (e.g., P3) and/or a specific physical address (e.g., F4). For example, the TLBI instruction 302 may be an instruction, for processing elements other than Core 0, to invalidate TLB entries that map virtual addresses to the physical address F4.

The TLBI instruction 302 may propagate from Core 0 to the interconnect 301, then within the interconnect 301, then from the interconnect 301 to processing elements such as Core 1 and Core N. Thus, a propagation time of the TLBI instruction 302 may be a sum of the time it takes for the TLBI instruction 302 to propagate from Core 0 to a receiving core (e.g., Core 1, Core N) via the interconnect 301. Note that propagation time of the TLBI instruction 302 may vary between different processing elements based on distance between the receiving core and the core that issued the TLBI instruction 302, or other factors such as various process variations, hardware capabilities of the cores, interconnect traffic, etc. Although Core 0 is shown as the processing element issuing a TLBI instruction in FIG. 3, other processing elements such as Core 1 and Core N may also be configured to issue TLBI instructions relating to TLB entry invalidations in their respective TLBs.

Core 1 may receive the TLBI instruction 302 from the interconnect 301, in response, may drain the SRQ 324, or any entries that are remaining in the SRQ 324 of the LSU 322, where the SRQ entries being drained may be committed store instructions. In response to completely draining the SRQ 324, Core 1 may send an acknowledgement signal (ACK) 304 to Core 0 to notify Core 0 that SRQ 324 has been drained. In response to sending the ACK 304, Core 1 may invalidate any TLB entries in the TLB 328 relating to the virtual address P3 and/or the virtual address F4 indicated in the TLBI instruction 302. For example, Core 1 may invalidate an entry M2 in the TLB 328 that maps the virtual address P3 to the virtual address F4. Core 0, in response to receiving the ACK 304 from Core 1 and all other cores (e.g., ACK 306 from Core N), may invalidate any TLB entries in the TLB 318 relating to the virtual address P3 and/or the virtual address F4. In an example, Core 0 may wait for ACK signals from all cores before resuming normal operations. For example, in response to receiving ACK signals from all cores, Core 0 may map the page P3 to another physical address and update the TLB 318 with the new mapping.

In an example, Core 1 may execute a logic 327 to detect whether the SRQ 324 is empty, and in response to the SRQ 324 being empty, trigger an action to send the ACK 304 to Core 0. However, if the logic 327 is corrupted, Core 1 may incorrectly detect that the SRQ 324 is empty even though the SRQ 324 may not be empty. If the SRQ is not empty but Core 1 sends the ACK 304 to Core 0, then a problem may arise if a committed store instruction is not properly drained from the SRQ 324. For example, if a committed store instruction to store to F4 remains in the SRQ 324, but the corruption in the logic 327 causes a failure to detect a presence of the committed store instruction in the SRQ 324, then Core 1 may proceed to send the ACK 304 to Core 0 and invalidate the entry M2. As a result of this error, Core 0, and cores other than Core 1, may not see a value being updated in F4 because the remaining committed store instruction in the SRQ 324 was not drained.

To reduce the chances of the failure to drain a SRQ properly, Core 0, Core 1, and Core N may each implement a delay circuit (e.g., circuit 230 shown in FIG. 2) that may be configured to apply a delay 330 on a drain cycle of the SRQs 314, 324, 344, respectively. In an example, the delay circuit may be integrated in the LSU 312, 322, 342. The delay 330 may be a specific number of cycles being added to a default drain cycle of a SRQ (e.g., SRQs 314, 324, 344), such that the SRQs 314, 324, 344 may be drained at a slower rate in response to the application of the delay 330. By slowing down the SRQ drain cycle, the chances of having SRQ entries remaining in the SRQ at the time of receiving a TLBI instruction may be increased. In other words, the delay 330 may provide additional time for the receiving processing element (e.g., Core 1 or Core N receiving the TLBI instruction 302) to identify SRQ entries relating to the TLBI instruction 302, and perform appropriate actions to remedy the situation. For example, Core 1 may identify a SRQ entry relating to F4 in the SRQ 324 and drain the identified entry from the SRQ 324 to L2 cache 326. In response to draining the SRQ 324 (e.g., drain until SRQ 324 is empty) Core 1 may invalidate TLB entries relating to TLBI instruction 302 in the TLB 328.

Figure 4:
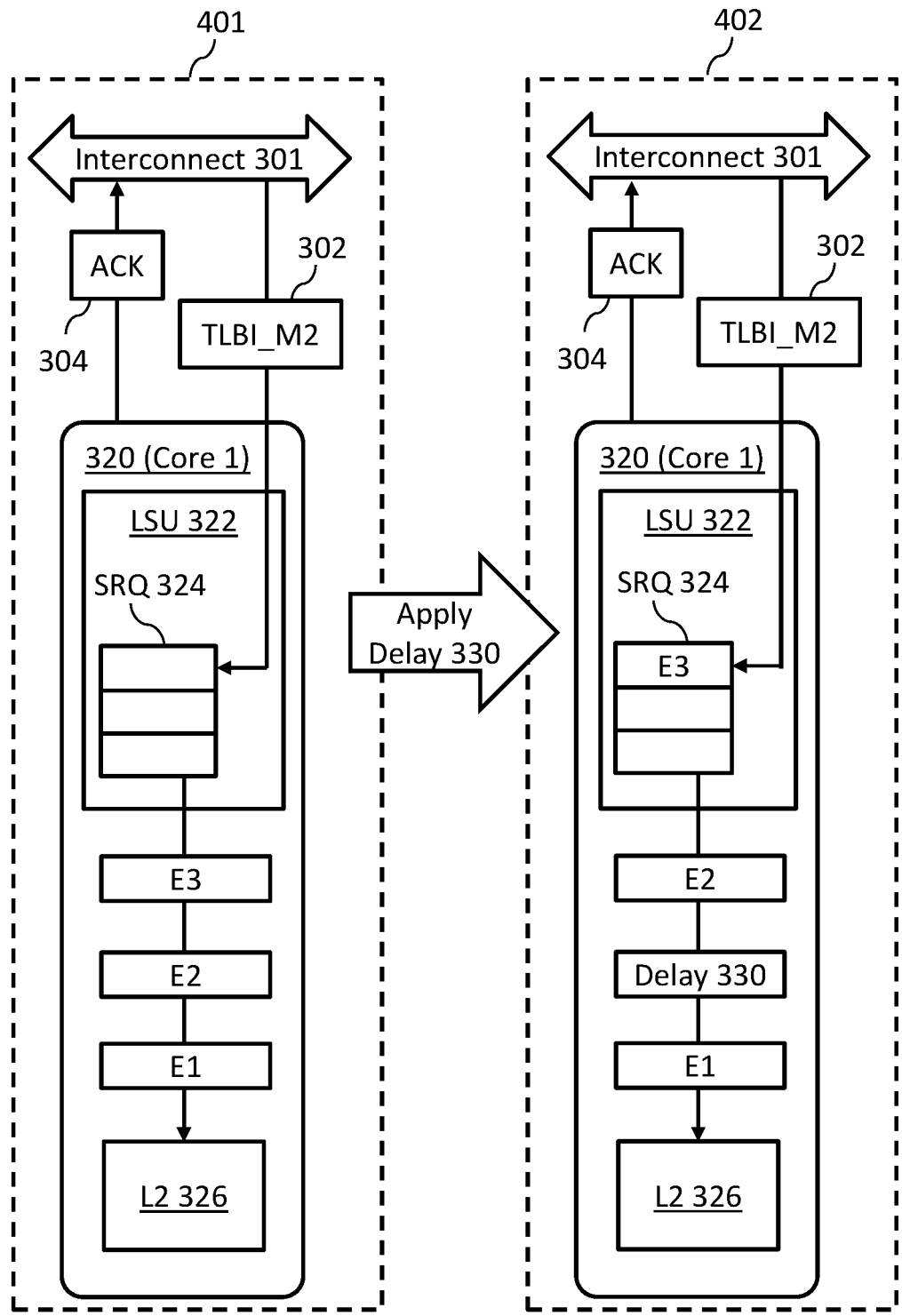
FIG. 4 illustrates another example implementation of validation of store coherence relative to page translation invalidation in an embodiment.

FIG. 4 illustrates another example implementation of validation of store coherence relative to page translation invalidation in an embodiment. In an example shown in FIG. 4, a scenario 401 shows Core 1 processing the TLBI instruction 302 without an application of the delay 330, and a scenario 402 shows Core 1 processing the TLBI instruction 302 with the application of the delay 330. In the scenario 401, when the TLBI instruction 302 is received by Core 1 from the interconnect, the SRQ 324 is empty and SRQ entries E1, E2, E3 are already drained to, for example, the L2 cache 326. If the SRQ entry E3 relates to the TLBI instruction 302 (e.g., writing to physical address F4), and the SRQ entry E3 is drained before Core 1 receiving the TLBI instruction 302, then E3 was drain properly. However, if the logic 327 (see FIG. 3) is corrupted in the scenario 401, then the SRQ 324 being empty may be incorrect. If the SRQ entry E3 is in the SRQ 324 but Core 1 mistakenly asserts that the SRQ 324 is empty, then the entry E3 may not be drained before Core 1 sends ACK 304 to interconnect 301.

In the scenario 402, when the TLBI instruction 302 is received by Core 1 from the interconnect, the SRQ 324 is not empty and the SRQ entry E3 is still in the SRQ 324 as a result of the delay 330 being applied to a draining cycle of the SRQ 324. Core 1 may determine that the SRQ entry E3 relates to the TLBI instruction 302, and may drain the SRQ entry E3 from the SRQ 324 before sending the ACK 304 to the interconnect 301. The application of the delay 330 may cause the SRQ 324 to drain slower and provide additional time for Core 1 to identify SRQ entries in the SRQ 324. In an example, in scenario 401, Core 1 may rely on the logic 327 to indicate that SRQ 325 is empty and send the ACK 304 to the interconnect 301 without checking if any entries may be remaining in the SRQ 324. By delaying the SRQ drain cycle, the chances of the SRQ 324 being empty may be reduced, thus triggering Core 1 to drain the SRQ 324 before sending the ACK 304.

In an example, the delay 330 may be a specific number of cycles being added to a default drain cycle of the SRQ 324, and the number of cycles in the delay 330 may be proportional to an amount of time required for a propagation of the TLBI instruction 302 among all cores in the multiprocessor system. In an example, the number of cycles in the delay 330 may be a product of a number of cycles it takes to drain each entry in the SRQ 324 and a size of the SRQ 324 (e.g., a number of entries allowed, or a maximum number of entries, in the SRQ 324). For example, a default number of cycles it takes to drain each entry in the SRQ 324 may be two (e.g., one SRQ entry drained every two cycles), and a number of entries allowed in the SRQ 324 may be 64. Thus, the number of cycles in the delay 330 may be any multiple of 64. In another example, the circuit 230 (see FIG. 2) may include a random number generator to generate a random number between 1 to a multiple of the number of entries allowed in the SRQ 324. The generated random number may be set as the number of cycles in the delay 330 and/or the number of delayed cycles for each SRQ entry. For example, the delay 330 applied to a first SRQ entry may be a first number of cycles and the delay 330 applied to a second SRQ entry may be a second number of cycles. In an example, the circuit 230 may include linear feedback shift registers (LFSR) that may implement random number generation. The number of cycles defining the delay 330 can be arbitrary, and can be configurable or programmable based on a desired implementation of the processor 102 (see FIG. 2).

Figure 5:
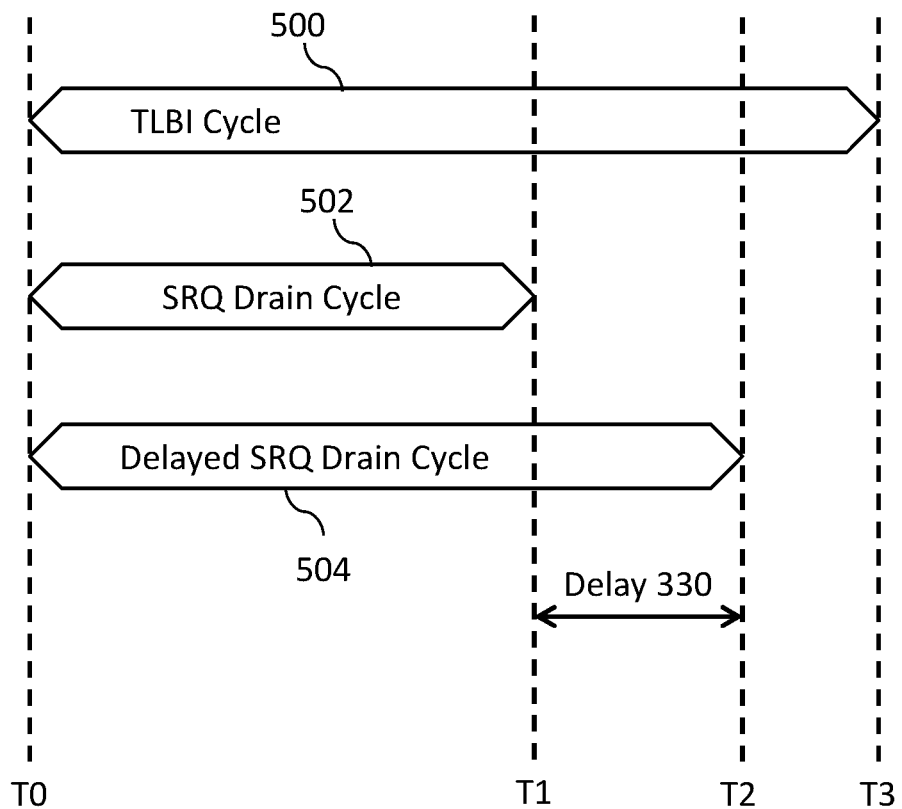
FIG. 5 illustrates another example implementation of validation of store coherence relative to page translation invalidation in an embodiment.

FIG. 5 illustrates another example implementation of validation of store coherence relative to page translation invalidation in an embodiment. In the example shown in FIG. 5, a TLBI cycle 500 may span from a time T0 to T3. The TLBI cycle 500 may include a propagation time of a TLBI instruction from a first processing element to a second processing element. A SRQ drain cycle 502 may span from the time T0 to a time T1. The SRQ drain cycle may be smaller than the TLB cycle, such that a SRQ may be drained at a faster pace when compared to the propagation of a TLBI instruction. Thus, the chances of a SRQ being empty when the TLBI instruction arrives at processing element increases if the SRQ drains faster than the propagation of the TLBI instruction. If the SRQ is empty when the TLBI arrives, then a SRQ logic being implemented for detecting whether the SRQ is empty cannot be tested since the SRQ is already empty (e.g., there is no non-empty SRQ to detect).

Upon applying the delay 330 to the SRQ drain cycle 502, the SRQ may be drained at a slower pace under a delayed SRQ drain cycle that spans from T0 to a time T2. Thus, a difference between the TLBI cycle 500 and SRQ drain cycle 502 may be decreased. In other words, an amount of overlap between the SRQ drain cycle 502 and the TLBI cycle 500 can increase in response to the application of the delay 330. The additional time T1 to T2 resulting from the delay 300 may increase a chance of keeping more SRQ entries in the SRQ, such that when the TLBI instruction arrives, the SRQ may not be empty and the chances of testing whether the SRQ logic (e.g., being implemented to detect an empty SRQ for sending acknowledgement) can be tested. Note that the delay 330 may be variable, such that the SRQ drain cycle 502 may be delayed to different amounts depending on a desired implementation.

Figure 6:
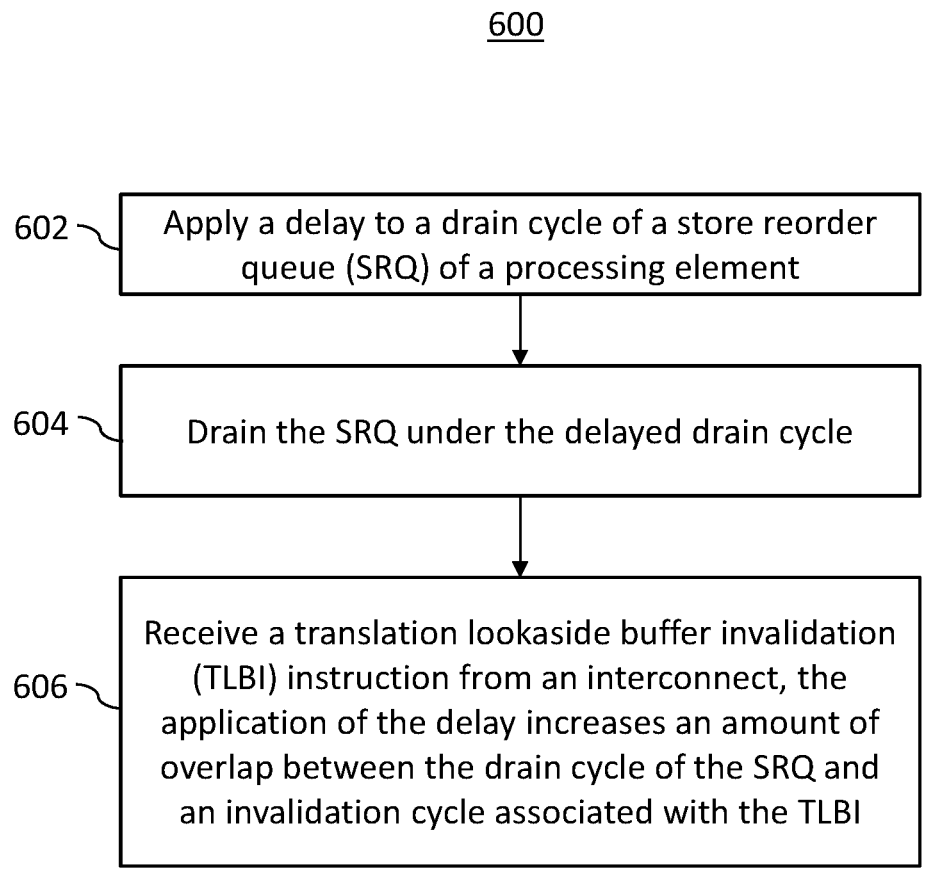
FIG. 6 illustrates an example flowchart example of validation of store coherence relative to page translation invalidation according to an embodiment.

FIG. 6 illustrates an example flowchart example of validation of store coherence relative to page translation invalidation in one embodiment. The process 600 can include one or more operations, actions, or functions as illustrated by one or more of blocks 602, 604, and/or 606. Although illustrated as discrete blocks, various blocks can be divided into additional blocks, combined into fewer blocks, eliminated, performed in parallel, or performed in different order, depending on the desired implementation.

The process 600 may begin at block 602. At block 602, a processing element may apply a delay to a drain cycle of a store reorder queue (SRQ) of the processing element. The processing element may be among a plurality of processing elements in a data processing system. The process 600 may proceed from block 602 to block 604. At block 604, the processing element may drain the SRQ under the delayed drain cycle. In an example, the delay may be proportional to an amount of time required for a propagation of the TLBI instruction from said another processing element to the processing element via the interconnect. In another example, the delay may be based on a product of a number of cycles it takes to drain each entry in the SRQ and a size of the SRQ. In another example, a number of cycles in the delay may be based on a random number between one to a multiple of the size of the SRQ The process 600 may proceed from block 604 to block 606. At block 606, the processing element may receive a translation lookaside buffer invalidation (TLBI) instruction from an interconnect connecting the plurality of processing elements. The TLBI instruction may be an instruction to invalidate a translation lookaside buffer (TLB) entry corresponding to at least one of a virtual memory page and a physical memory frame. The TLBI instruction may be broadcasted by another processing element connected to the interconnect. The application of the delay to the drain cycle of the SRQ may decrease a difference between the drain cycle of the SRQ and an invalidation cycle associated with the TLBI.

In an example, in response to receiving the TLBI instruction, the processing element may determine whether to send an acknowledgement signal or to drain the SRQ. For example, the processing element may identify a SRQ entry in the SRQ associated with the TLB entry being invalidated, and may drain the identified SRQ entry from the SRQ. In an example, in response to the processing element completely draining the SRQ, the processing element may send the acknowledgement signal to the processing element that broadcasted the TLBI instruction via the interconnect. In an example, in response to receiving the TLBI instruction, the processing element may determine that the SRQ is empty and may send the acknowledgement signal to the processing element that broadcasted the TLBI instruction via the interconnect.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    delaying a drain cycle of a store reorder queue (SRQ) of a processing element to increase an amount of overlap between the drain cycle of the SRQ and an invalidation cycle associated with a translation lookaside buffer (TLB); and
    draining the SRQ under the delayed drain cycle.

2. The method of claim 1, further comprising:
    receiving a translation lookaside buffer invalidation (TLBI) instruction from an interconnect connecting the processing element to another processing element, the TLBI instruction being an instruction to invalidate a TLB entry corresponding to at least one of a virtual memory page and a physical memory frame, wherein the delay to the drain cycle of the SRQ increases an amount of overlap between the drain cycle of the SRQ and an invalidation cycle associated with the TLBI.

3. The method of claim 2, wherein the TLBI instruction is broadcasted by said another processing element.

4. The method of claim 1, further comprising, under the delayed drain cycle, implementing a SRQ logic to detect whether the SRQ is empty or not.

5. The method of claim 1, further comprising:
    identifying a SRQ entry in the SRQ associated with a TLB entry being invalidated; and
    draining the identified SRQ entry from the SRQ.

6. The method of claim 1, further comprising draining the SRQ prior to sending an acknowledgement signal to another processing element to notify said another processing element that the SRQ is drained.

7. The method of claim 1, wherein the delay is proportional to an amount of time required for a propagation of a TLBI instruction from the processing element to another processing element via an interconnect.

8. The method of claim 1, wherein the delay is based on a product of a number of cycles it takes to drain each entry in the SRQ and a size of the SRQ.

9. The method of claim 1, wherein a number of cycles in the delay is based on a random number between one to a multiple of a size of the SRQ.

10. A computing system comprising:
    a plurality of processing elements;
    an interconnect that connects the plurality of processing elements, wherein each one of the plurality of processing elements is configured to:
        delay a drain cycle of a store reorder queue (SRQ) of a processing element to increase an amount of overlap between the drain cycle of the SRQ and an invalidation cycle associated with a translation lookaside buffer (TLB); and
        drain the SRQ under the delayed drain cycle.

11. The computing system of claim 10, wherein each one of the plurality of processing elements is configured to delay the drain cycle of the SRQ in response to a receipt of a translation lookaside buffer invalidation (TLBI) instruction, the TLBI instruction is an instruction to invalidate a TLB entry corresponding to at least one of a virtual memory page and a physical memory frame, and the delay to the drain cycle of the SRQ increases an amount of overlap between the drain cycle of the SRQ and an invalidation cycle associated with the TLBI.

12. The computing system of claim 11, wherein the TLBI instruction is broadcasted on the interconnect.

13. The computing system of claim 12, wherein each one of the plurality of processing elements includes a random number generator implemented by one or more linear feedback shift registers, the random number generator is configured to generate a random number between one to a multiple of a size of the SRQ, and a number of cycles in the delay is based on the random number.

14. The computing system of claim 10, wherein each one of the plurality of processing elements comprises a load store unit (LSU) and a TLB, and the SRQ is inside the LSU.

15. The computing system of claim 10, wherein each one of the plurality of processing elements is configured to, in response to completely draining the SRQ, send an acknowledgement signal to the interconnect.

16. A computer program product comprising a computer readable storage medium having program instructions embodied therewith, the program instructions readable by a device to cause the device to:
    delay a drain cycle of a store reorder queue (SRQ) of a processing element to increase an amount of overlap between the drain cycle of the SRQ and an invalidation cycle associated with a translation lookaside buffer (TLB); and
    drain the SRQ under the delayed drain cycle.

17. The computer program product of claim 16, wherein the device is further caused to receive a translation lookaside buffer invalidation (TLBI) instruction from an interconnect connecting the processing element to another processing element, the TLBI instruction being an instruction to invalidate a TLB entry corresponding to at least one of a virtual memory page and a physical memory frame, wherein the delay to the drain cycle of the SRQ increases an amount of overlap between the drain cycle of the SRQ and an invalidation cycle associated with the TLBI.

18. The computer program product of claim 16, wherein the device is further caused to, under the delayed drain cycle, implement a SRQ logic to detect whether the SRQ is empty or not.

19. The computer program product of claim 16, wherein the device is further caused to:

identify a SRQ entry in the SRQ associated with a TLB entry being invalidated; and drain the identified SRQ entry from the SRQ.

20. The computer program product of claim 16, wherein the device is further caused to generate a random number between one to a multiple of a size of the SRQ, and a number of cycles in the delay is based on the random number.

\* \* \* \* \*